Sept. 20, 1932.  R. K. WINNING  1,878,357
CONTROL ROD HOUSING
Filed Jan. 28, 1929
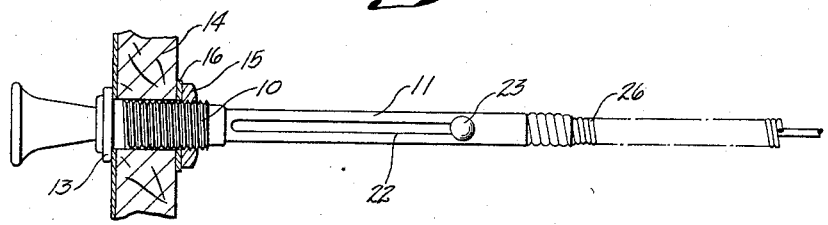
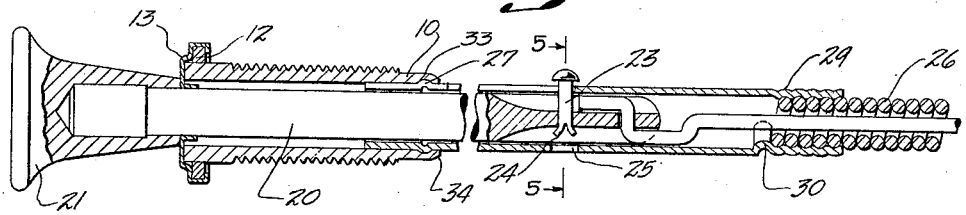
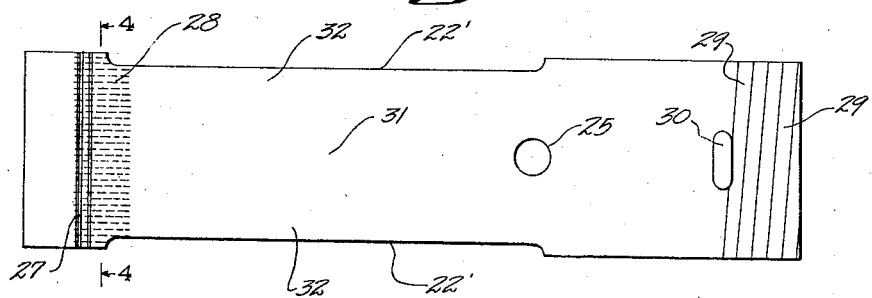
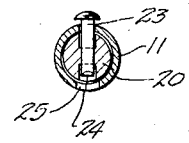
INVENTOR.
Robert K. Winning
BY
Erwin, Wheeler & Woolard
ATTORNEYS.

Patented Sept. 20, 1932

1,878,357

UNITED STATES PATENT OFFICE

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN

CONTROL ROD HOUSING

Application filed January 28, 1929. Serial No. 335,510.

This invention relates to improvements in jointed tubular supports for control rod housing assemblies and the like. The method of assembling the housing herein described is claimed in my divisional application Serial No. 398,676 filed October 10, 1929.

It is the object of the invention to provide a novel and simplified form of control rod housing lending itself to manufacture in quantities at reduced cost and providing for added convenience of assembly of a mounting sleeve and a tubular housing comprising a support for the movable parts of the control.

In the drawing—

Figure 1 is a plan view of a housing embodying this invention as it appears applied to the dash of a motor vehicle or the like.

Figure 2 is an enlarged axial section in a vertical plane through the housing shown in Figure 1;

Figure 3 is a still further enlarged detail of the blank from which the housing shown in Figures 1 and 2 is formed;

Figure 4 is a detail in transverse section on a smaller scale than Figure 3 showing the housing in process of formation;

Figure 5 is a transverse section taken in the plane indicated at 5—5 in Figure 2.

Like parts are identified by similar reference numerals throughout the several views.

The housing comprises a tubular supporting element 10 which may conveniently be die-cast, and a tubular sheath or housing member 11 which is preferably made from a stamped blank and formed as hereinafter disclosed. The die-cast supporting housing 10 of the housing is provided at 12 with a flange and an annular bezel 13 which covers the end of the housing and the flange and constitutes a head adapted to abut the outer surface of a dash 14. A nut 15 threaded to the supporting member 10 is tightened against a lock washer 16 which is in face contact with the dash in opposition to the head above described. The clamping engagement of these parts upon the dash positions the entire device.

The control rod 20 is axially slidable through the housing and is provided exteriorly thereof with a knob 21. It is desirable to maintain this knob in a predetermined position of rotation in order that any lettering or design appearing on the face thereof may be kept erect. In order to accomplish this result a slot is provided at 22 in the sheath portion 11 of the housing and a rivet 23 extends through this slot into engagement with rod 20 and is upset at 24 to prevent its loss during the reciprocation of the rod. The rivet moves in slot 22 and serves to keep the rod and knob in predetermined angular relation to the housing. An opening formed at 25 in the housing permits the introduction of a tool to perform the riveting operation which upsets rivet 23 in the manner shown at 24. The arrangement whereby this riveting operation is conducted within the housing makes the housing much stronger than it would be if the rivet were extended through another slot similar and opposite to the slot 22 and were riveted outside of the housing as has heretofore been the practice.

In the manufacture of the tube portion 11 of the housing it is necessary to provide for a means of attachment of such portion to the supporting sleeve 10 which will insure against relative rotation of the parts since the control rod and knob take their angular position from the tube and the tube must depend for its angular position upon the mounting support 10. It is also necessary to provide economically for the attachment of the helical wire sheath 26 to the parts already described. Through this sheath extends the Bowden wire to be operated by the control rod, such wire being connected thereto as disclosed in my co-pending application Ser. No. 163,084 filed January 24, 1927. Both of these objectives are cared for in the blank from which the tube 11 is formed.

Figure 3 shows the blank. It will be noted that it is cut away at 22' along its side margins so that when such side margins are ruled into adjacent positions the portions cut away will co-operate to provide the slot 22 in which the guide rivet 23 operates. At 25 appears the hole which is subsequently to enable the riveting operation to be conducted within the tube 11. At 27 the blank is transversely ribbed and at 28 the blank is provided with a transversely extending series of relatively short longitudinally disposed notches which may be formed by a die having teeth similar to the teeth of a saw but of greater extent. These notches extend across the rib 27.

At 29 the blank is provided with a series of angularly disposed and mutually parallel ribs adapted in the completed tube to serve as threads into which the end of the wire sheath 26 may be screwed. In order to limit the relative engagement of the parts the thread is mutilated by providing at 30 a boss which intersects the last of the ribs 29 and is of materially greater height than such ribs.

The blank being completed in the form shown in Figure 3, it is necessary to form it to the shape of a tube.

It would be difficult if not impossible to bring the side margins of the blank into mutual abutment by any ordinary forming process. Accordingly the blank is first formed as shown in Figure 4 whereby the intermediate portion 31 thereof is given a curvature which is opposite to that which it will ultimately have in the completed tube and the side marginal portions 32 are each formed to approximately the exact curvature of the completed tube. With the side marginal portions thus formed to the desired curvature it is a relatively simple matter to exert pressure to reverse the curvature of the central portion 31 of the blank, thereby forcing the side margins into abutment.

The completed tube 11 is now introduced into the end of the supporting member 10 with the rib 27 abutting the shoulder 33 of the support. The end portion 34 of the support is now spun inwardly over the rib 27 and in the course of the spinning operation the metal of the support is forced into the notches or serrations 28, thereby perfecting a relatively non-rotatable joint between the parts.

Helix 26 is now screwed into the threads formed by ribs 29 until the end of the helix abuts the boss or lug 30 which stops further relative screwing movement. This completes the assembly of the parts.

I claim:

1. A device of the character described, comprising a supporting sleeve, panel clamping means upon said sleeve, and a tubular extension fitted within said sleeve and provided therein with a peripheral rib about which an integral portion of said sleeve is interlockingly engaged, said tube comprising a sheet metal blank having side marginal portions in substantial abutting relation.

2. A device of the character described, comprising a supporting sleeve, panel clamping means carried by said sleeve, and a tubular extension fitted within said sleeve and provided therewithin with a peripheral rib upon the peripheral surface of which are longitudinally extending teeth crossing said rib, said sleeve having integral portions embracing said rib and intimately interlocked with said rib and the teeth thereon.

3. A device of the character described, comprising a supporting sleeve, panel clamping means carried by said sleeve, and a tubular extension fitted within said sleeve and provided therewithin with a peripheral rib upon the peripheral surface of which are longitudinally extending teeth crossing said rib, said sleeve having integral portions embracing said rib and intimately interlocked with said rib and the teeth thereon, said tubular extension comprising a sheet metal blank in such form that portions of its lateral margins are in substantial abutment, the spacing between the teeth thereof being such as to permit of the forming of said extension from a flat blank in which said rib is embossed and serrated.

4. A device of the character described, comprising a supporting sleeve provided with an internal shoulder, an extension tube comprising a sheet metal blank having abutting side marginal portions and a peripheral rib, said tube being fitted internally to said sleeve with said rib seated against said shoulder, teeth extending longitudinally of said tube across said rib, and means integral with said sleeve interlocked in intimate engagement about said rib and the teeth thereof.

ROBERT K. WINNING.